US008472676B2

(12) United States Patent
Blair et al.

(10) Patent No.: US 8,472,676 B2
(45) Date of Patent: Jun. 25, 2013

(54) APPARATUS AND METHOD FOR ANALYSING A SECURITY DOCUMENT

(75) Inventors: Ronald Bruce Blair, Flower Mound, TX (US); Alexandre Gret, Liebefeld (CH)

(73) Assignee: De la Rue International Limited, Basingstoke Hampshire (GB)

( * ) Notice: Subject to any disclaimer, the term of this patent is extended or adjusted under 35 U.S.C. 154(b) by 456 days.

(21) Appl. No.: 12/451,766

(22) PCT Filed: Jun. 6, 2007

(86) PCT No.: PCT/GB2007/002071
§ 371 (c)(1), (2), (4) Date: Feb. 18, 2010

(87) PCT Pub. No.: WO2008/149051
PCT Pub. Date: Dec. 11, 2008

(65) Prior Publication Data
US 2010/0166264 A1 Jul. 1, 2010

(51) Int. Cl.
*G06K 9/00* (2006.01)

(52) U.S. Cl.
USPC .......... 382/112

(58) Field of Classification Search
USPC .......... 382/100, 112, 135–139; 194/4–7; 209/534–537; 235/379–382; 250/200–207; 356/71–75
See application file for complete search history.

(56) References Cited

U.S. PATENT DOCUMENTS

| | | | |
|---|---|---|---|
| 987,868 A | | 3/1911 | Ellis |
| 3,590,992 A | | 7/1971 | Soderstrom |
| 4,183,989 A | | 1/1980 | Tooth |
| 4,366,382 A | | 12/1982 | Kotowski |
| 4,386,432 A | | 5/1983 | Nakamura et al. |
| 4,536,709 A | | 8/1985 | Ishida |
| 4,943,093 A | | 7/1990 | Melling et al. |
| 4,980,569 A | | 12/1990 | Crane et al. |
| 5,057,268 A | * | 10/1991 | Muller .......... 376/157 |
| 5,419,424 A | | 5/1995 | Harbaugh |
| 5,468,971 A | | 11/1995 | Ebstein et al. |
| 5,486,022 A | | 1/1996 | Crane |
| 5,583,904 A | | 12/1996 | Adams |

(Continued)

FOREIGN PATENT DOCUMENTS

| | | |
|---|---|---|
| EP | 0 381 550 A1 | 8/1990 |
| GB | 2 062 854 A | 5/1981 |

(Continued)

OTHER PUBLICATIONS

International Search Report for International Application No. PCT/GB2007/002071, issued on Feb. 26, 2008, ISA: European Patent Office.

(Continued)

*Primary Examiner* — Atiba O Fitzpatrick
(74) *Attorney, Agent, or Firm* — Oliff & Berridge, PLC

(57) ABSTRACT

We provide an apparatus and method for analysing a security document. An x-ray source is adapted to illuminate at least one inspection region of the security document when located at an inspection position. An x-ray detector adapted to receive x-rays from the at least one inspection region of the document and to generate a corresponding detector response. A processor analysis the detector response and generates an output signal indicative of the structure of the document in the at least one inspection region.

31 Claims, 4 Drawing Sheets

U.S. PATENT DOCUMENTS

| | | | | |
|---|---|---|---|---|
| 5,667,079 | A | 9/1997 | Jongebloed | |
| 5,810,146 | A | 9/1998 | Harbaugh | |
| 6,104,036 | A | 8/2000 | Mazowiesky | |
| 6,438,262 | B1 | 8/2002 | Bernardini et al. | |
| 6,474,695 | B1 | 11/2002 | Schneider et al. | |
| 6,647,091 | B2 * | 11/2003 | Fenkart et al. | 378/57 |
| 6,917,040 | B2 | 7/2005 | Thierauf et al. | |
| 6,987,868 | B1 | 1/2006 | Atarashi et al. | |
| RE39,490 | E | 2/2007 | Cote et al. | |
| 7,656,995 | B2 | 2/2010 | Robinson | |
| 7,860,293 | B2 | 12/2010 | Schutzmann | |
| 2003/0142865 | A1 * | 7/2003 | Hirota et al. | 382/167 |
| 2003/0194052 | A1 | 10/2003 | Price et al. | |
| 2007/0122023 | A1 * | 5/2007 | Jenrick et al. | 382/135 |
| 2007/0154078 | A1 | 7/2007 | He et al. | |
| 2008/0090726 | A1 | 4/2008 | Eskra et al. | |
| 2010/0163466 | A1 | 7/2010 | Blair et al. | |
| 2010/0206779 | A1 | 8/2010 | Blair et al. | |

FOREIGN PATENT DOCUMENTS

| | | | |
|---|---|---|---|
| JP | A-2003-132470 | | 5/2003 |
| JP | A-2005-085163 | | 3/2005 |
| WO | WO 01/88860 | A1 | 11/2001 |
| WO | WO 2008/149051 | A1 | 12/2008 |

OTHER PUBLICATIONS

Aug. 2, 2012 EPO Communication in European Application No. 07 733 083.5.

Nov. 13, 2007 International Search Report issued in International Patent Application No. PCT/GB2007/002068.

Jan. 3, 2008 International Search Report issued in European International Patent Application No. PCT/GB2007/002076.

May 20, 2011 Office Action issued in U.S. Appl. No. 12/451,745.

Nov. 25, 2011 Office Action issued in U.S. Appl. No. 12/451,745.

Jan. 12, 2012 Office Action issued in U.S. Appl. No. 12/451,767.

Mar. 9, 2012 Office Action issued in U.S. Appl. No. 12/451,745.

U.S. Appl. No. 12/451,767, filed Feb. 23, 2010 in the name of Blair.

U.S. Appl. No. 13/669,086, filed Feb. 23, 2010 in the name of Blair.

U.S. Appl. No. 12/451,745, filed Feb. 24, 2010 in the name of Blair.

U.S. Appl. No. 13/456,069, filed Apr. 25, 2012 in the name of Blair.

Rendle et al., "An inexpensive device for the examination of light objects using soft x-rays", Measurement Science and Technology, May 21, 1990, pp. 986-988, vol. 1, No. 9, IPO Publishing LTD, United Kingdom, XP-20066322A.

Jul. 3, 2012 Office Action issued in U.S. Appl. No. 12/451,767.

* cited by examiner

APPARATUS AND METHOD FOR ANALYSING A SECURITY DOCUMENT

FIELD OF THE INVENTION

The present invention relates to an apparatus and method for analysing a security document, in particular by use of an x-ray technique.

BACKGROUND TO THE INVENTION

There are now a number of well established techniques for increasing the security of certain types of document. Such "security documents" include banknotes (including paper and plastic currency), bonds, legal documents, identification documents and other documents where the authenticity of the document is extremely important.

Such documents are often provided with one or more overt or covert "security features", these including specialist inks, optically variable elements, watermarks, security threads, specialist printing techniques and particular substrate materials. These security features are used to authenticate or discriminate between documents either by manual inspection, or more often, by various automatic methods. For example, it is possible to use magnetic techniques to detect the presence of magnetic material in the security threads or printing inks. Certain printing techniques are also used which produce surface relief which can in turn also be detected automatically. Thus in many such automatic methods, various sensors are provided to generate data relating to the particular documents, the data from the security features in particular being used to distinguish between document types and between genuine and counterfeit documents. In many cases, various optical methods are used, in transmissive or reflective arrangements, including infrared and ultraviolet measurements, so as to distinguish between the different types of document in the desired manner.

One type of counterfeiting technique used particularly in banknotes is that of producing a composite note. Such notes are constructed by cutting out small pieces from genuine currency and replacing the removed pieces with counterfeit material having a similar appearance. The removed genuine pieces can then be used in the production of further counterfeit banknotes whilst the original notes from which they are extracted are also used is transactions. Such composite notes are generally formed by the gluing or taping together of pieces of counterfeit and genuine banknote material which makes their automatic detection difficult since a number of the security features within the banknotes will be from genuine notes. Other types of composite notes may also be fabricated from different notes of genuine currency, these being sometimes of different denominations. Composite banknotes are constructed to deliberately defraud either an untrained user or automatic machines which authenticate notes using techniques relating to certain features of the notes. Thus the composite notes may be targeted at particular types of automatic machines.

In addition to counterfeiting, security documents can become damaged by deliberate or accidental actions during their lifetime. It is desirable to detect such damage which may include cuts (such as incisions and tears) in the documents. This is particularly important in automated document processing apparatus, since damaged documents may cause jams and also since such damage may indicate the existence of a counterfeit document.

There is therefore an ongoing need to improve the range of methods by which automatic analysis of security documents may be performed.

SUMMARY OF THE INVENTION

In accordance with a first aspect of the invention we provide apparatus for analysing a security document, comprising an x-ray source adapted to illuminate at least one inspection region of the security document when located at an inspection position, an x-ray detector adapted to receive x-rays from the at least one inspection region of the document and to generate a corresponding detector response, and a processor adapted to analyse the detector response and to generate an output signal indicative of the structure of the document in the at least one inspection region.

We have realised that, with the use of an x-ray technique, the structure of security documents can be analysed and this information can be used to provide automatic analysis of the type of security document in question. X-rays are advantageous since they have a greater penetrative power than optical methods and also since, for many materials, their interaction with the materials differs significantly from the interaction at light wavelengths. The method performed by the apparatus may be achieved using a stationary document. This might be the case in apparatus where single documents are inspected. Alternatively it might be used in apparatus having a stack of documents for automatic feeding and processing and in which the analysis is performed according to the invention whilst the document is stationary in a feed tray containing the document stack. For example the next document to be fed (either top-most or bottom-most in the stack) may be that which is analysed, the end of the stack comprising the inspection position. Preferably, the apparatus further comprises a transport path for transporting the document through the inspection position wherein the apparatus is arranged such that the x-ray source illuminates the document when in the transport path. X-ray source and detector combinations and arrangements can be used to provide highly detailed spatial information regarding the document structure within the inspection region.

The use of x-rays allows a wealth of structure information to be obtained from the one or more inspection regions of the document. It is preferred that the apparatus is adapted to locate one or more discontinuities in the structure of the document within the inspection region, preferably including their extent. Such discontinuities may take a number of forms, for example, these including interfaces present within the structure of the document. Such discontinuities are typically located within the primary (substrate) material of the document, although they may be within secondary materials such as one or more layers mounted to the substrate. Thus the interfaces may comprise an interface between materials of a similar type. Such similar types may include materials which are not identical although are nominally similar in that they are arranged to be sufficiently similar to pass as the same type of material either under manual or automated inspection techniques. The interfaces may also be between dissimilar materials. It will be appreciated that many genuine documents contain "deliberate" interfaces, examples of which include the boundaries of security features. The ability to detect interfaces which are not of the same type or are not in the same position as deliberate interfaces, provides the means to detect unexpected document types such as counterfeit documents or those bearing damage.

The interfaces may include an additional material such as an adhesive so as to bond together the materials forming the document at the discontinuity. The interfaces may also comprise the absence of material, this being the case where a cut in the material is present. It should be noted herein that a "cut" includes a tear or an incision, whether deliberate or accidental, and each of which may pass partially or fully through the document in question between its opposed faces.

The x-ray detector is typically a line scan detector such as a line scan camera. This provides advantages in terms of cost and in reducing the x-ray power used for a given transport path speed. It is however also envisaged as an alternative that an array scan or "imaging" detector may be used which produces two dimensional pixel array x-ray image information. Typically of course an equivalent image may be formed by the combination of line scans from a line scan detector.

An x-ray source providing an area of emitted x-rays in two dimensions may be used either with a line or area detector. It is preferred to obtain multiple line scans within the inspection region.

The security document may therefore be fed along the transport path by a leading edge wherein the length of the detector is preferably equal to at least that of the leading edge. This is a preferred arrangement in the case of a "short edge" feed for rectangular documents. The use of a "long edge" feed is also contemplated. In the case of the use of an array scan, such as an imaging detector, the image of the entire document or a part thereof, may be taken and used, regardless of the type of feed (short edge or long edge).

Preferably the x-ray source is located upon an opposite side of the inspection position (transport path) with respect to the x-ray detector so as to provide a transmissive arrangement. Thus the x-ray contrast in such an arrangement is generated by the transmissive arrangement. It is also however envisaged that, assuming the use of appropriate materials which re-emit or fluoresce in the x-ray frequency upon stimulation of x-rays from the source, that a reflective arrangement may be used either as an alternative to or in addition to the transmissive arrangement described. In this case, for the reflective arrangement, the source and detector may be positioned upon a similar side of the transport path. Thus the "sides" of the transport path may be thought of in terms of the opposing planar faces of the security documents in question.

Typically the x-ray source and/or detector are positioned approximately normally to the face of the document as it passes along the transport path, so as to maximise both the received signal and the spatial resolution of the data obtained.

The monitoring of the inspection region structure may be achieved by monitoring the positional variation in intensity of the x-ray data produced by the detector. Typically therefore the apparatus is arranged to generate sufficient x-ray contrast so as to enable the processor to locate the position of the said discontinuities.

The data are preferably processed by the "obtained" response from the detector (detector response), being compared with a predetermined response corresponding to that obtained from an "expected" document such as a genuine document. The comparison may involve the consideration of intensity or contrast thresholds and the number or proportion of pixels which pass such thresholds. Preferably however, the apparatus is adapted to generate an image of the inspection region formed from a number of detector responses generated at different locations for each document.

The processor is therefore preferably adapted to compare the image with one or more predetermined master images. A set of such master images may be provided, in the case of banknotes, for each particular denomination of a currency. Typically four such master images are provided for each denomination, currency type or issue, these relating to possible feed orientations. An image analysis process may be used to make the comparison and, as a result, an output is generated which is dependent upon the result of the image analysis process. This may involve a number of known techniques of image analysis, for identifying features within images. The image analysis process is used to analyse the structure of the document and in particular to preferably locate the discontinuities.

Typically some measure of correspondence between the obtained and predetermined response is produced as a result of the analysis and, provided such correspondence is sufficient, the documents may be determined as being of the same type as that of the corresponding master image.

The apparatus may be used as part of document sorting apparatus for example for rapidly sorting documents according to their type. It may also be used in a document authenticator for sorting genuine documents from counterfeit documents and of course it may be used in apparatus combining sorting and authentication functions. The apparatus finds particular use in banknote processing fields although it will appreciated that it may be used for processing other security documents.

It is envisaged that the apparatus will find particular advantage in high speed processing of documents, that is, in excess of 600 documents per minute.

In accordance with a second aspect of the present invention we also provide a method of analysing a security document, the method comprising illuminating at least one inspection region of the security document with x-rays from an x-ray source, whilst the document is in an inspection position, receiving x-rays from the at least one inspection region at an x-ray detector adapted to generate a corresponding detector response, and analysing the detector response so as to generate an output signal indicative of the structure of the document within the at least one inspection region.

The method therefore is preferably performed by the functioning, during use, of the apparatus according to the first aspect.

Typically the method further comprises transporting the security document to and from the inspection position along a transport path.

It will be understood that preferably the document is in motion whilst the x-rays are received. Indeed it is preferred that each of the steps is performed, including the analysis, whilst the document is in motion.

The data representative of the detector response are preferably processed so as to modify the intensity contrast as part of the analysis. The data may also be processed so as to reduce noise. Each of these processing steps aids the correct analysis of the data.

Typically the structure is analysed by locating one or more discontinuities in the document structure in the said at least one inspection region. Preferably such discontinuities are interfaces. The method may also further comprise detecting the presence of an additional material, such as an adhesive, at the interfaces.

In simple cases the analysis may comprise comparing the detector response with a threshold intensity level, or indeed an intensity range and processing the document accordingly. Preferably however, the analysis comprises comparing the detector response with one or more master patterns corresponding to expected document types.

The output signal may take the form of a data flag or a control signal for use by other apparatus. In general the signal is at least of a binary format, being indicative of whether the document is of an expected type or an unexpected type. The signal may comprise a number of different possible values or categories, such as a number of different expected and/or unexpected document types, dependent upon the analysis performed. In most cases, the output signal is used to control the further processing of the documents downstream. Thus the method may further comprise diverting documents of an expected type along a first transport path and those of an unexpected type along a second document path. The documents may then be provided to appropriate output trays or to other apparatus for further processing.

BRIEF DESCRIPTION OF THE DRAWINGS

Some examples of an apparatus and method according to the present invention will now be described with reference to the accompanying drawings, in which.

DETAILED DESCRIPTION OF EXAMPLES

We now describe some examples of document processing apparatus in which the apparatus is adapted for processing documents in the form of banknotes.

Figure 1:
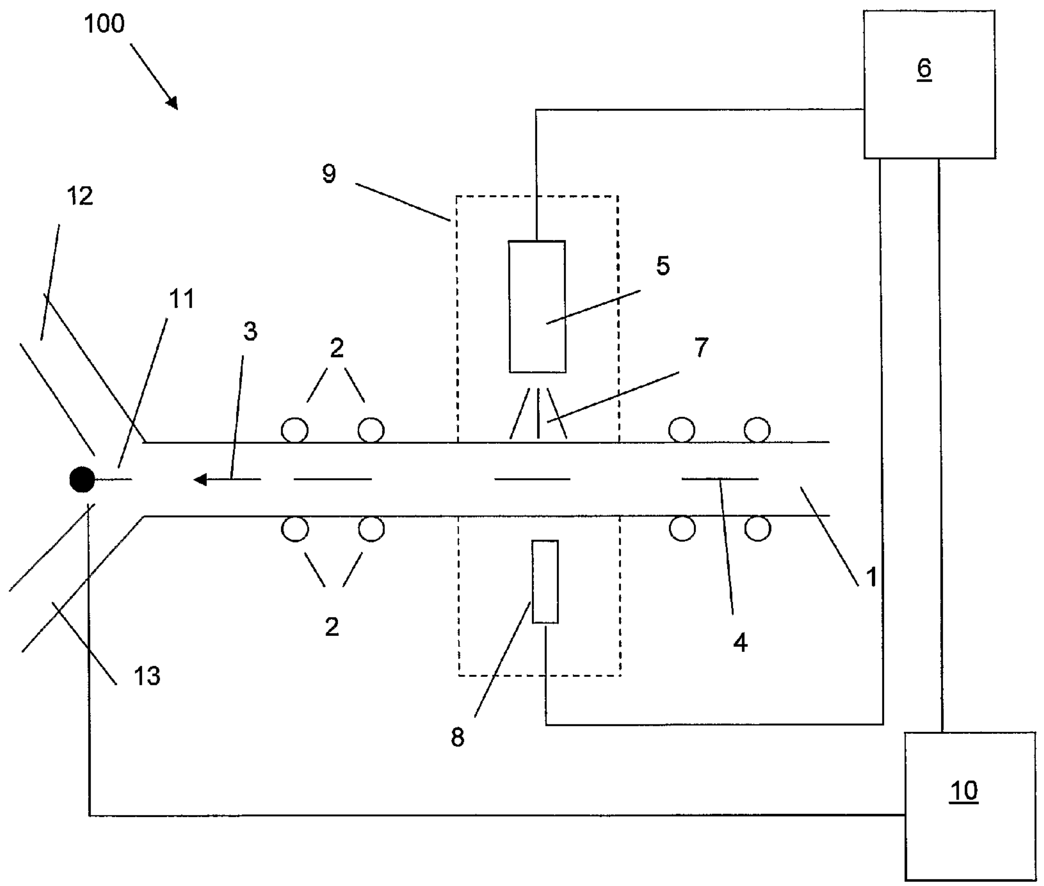
FIG. 1 is schematic representation of an example apparatus.

In FIG. 1, a first example is shown with the apparatus generally indicated at 100. A document transport path is illustrated at 1, this comprising a number of driven and idler rollers indicated at 2 (the drive mechanism not being shown). The rollers 2, together with various guide members and belts, securely drive banknotes along the transport path in a direction indicated by the arrow 3.

Three example banknotes 4 are shown within the transport path. As will be appreciated, FIG. 1 is schematic and therefore the separation between the opposing sides of the transport path (upper and lower in FIG. 1) is present only for clarity in illustrating the operation of the apparatus 100.

An x-ray source 5 is shown positioned within close proximity of the transport path and arranged to have an emission axis approximately normal to the surface of the banknotes 4. A typical separation between the surface of the banknote and the x-ray source 5 is a few centimeters in this example. The x-ray source has a typical operational voltage of few tens of kilovolts, in this case 40 kV. Typical operational currents lie within the range of a few tens of milliamperes, for example 14 mA.

The operation of the x-ray source is governed by a control system 6, this allowing control over the x-ray source voltage and current. Thus the intensity of x-rays emitted from the x-ray source is controllable by the controller 6. In the present example, when in use, the x-ray source emits a beam of x-rays which impinge upon the surface of the banknotes 4. This may be constrained by the use of an aperture, for example to illuminate only part of the target banknote.

An x-ray detector 6 is located upon the opposite side of the transport path 1 from the source 5. The detector is positioned so as to receive x-rays from one or more inspection regions of the banknote 4. The x-rays have either passed through the banknote 4 from the source 5 or have been generated by interaction between the x-rays 7 with the material within (including adhered to) the banknote 4 causing emission of x-rays from the material (fluorescence). The detector 8 takes the form of a line scan camera. The detector 8 extends in a direction normal to the plane of FIG. 1, this including the full width of the banknotes 4 within the transport path in the present example. A typical spatial resolution for such a camera is around 0.2 mm.

The detector 8 receives x-rays from the banknote 4 across the width of the transport path and converts the received x-rays into corresponding data which are provided to the controller 6. It should be noted that the x-ray source 5 and x-ray detector 8 are illustrated very schematically within FIG. 1, for example the figure not showing ancillary devices such as power sources for these components.

The apparatus complies with x-ray safety standards due to the use of an appropriately compliant x-ray source and due to the presence of a shielding system illustrated at 9. The shielding system comprises an x-ray absorptive enclosure constructed from a metallic material such as lead. A narrow slot within opposing walls of the shielding system 9 provides access for the transport path 1 passing through the shielding system 9.

The transport path 1 illustrated in FIG. 1 is intended to represent generically a number of possible transport path systems. One example system provides a banknote transfer rate in excess of 1 meter per second. In some cases, a speed of around 10 meters per second may be achieved.

The controller 6 is operated by a computer system 10. The computer 10 uses the data received from the detector to determine whether the banknote 4 is of an "expected" type or an "unexpected" type. This is described later with reference to FIG. 6. Having determined the type of banknote using the data provided by the detector 8, the computer 10 controls the operation of a gate 11 positioned downstream of the detector 8. The gate 11 causes the banknotes to be deflected down one of two possible paths, a first path 12 being for the expected documents and the second path 13 for the unexpected documents.

"Expected" documents may be categorised depending upon the type of apparatus used, such as genuine banknotes, and in such a case unexpected documents may be banknotes which have failed to meet an authentication test based upon the data from the x-ray detector. It will also be appreciated that the gate 11 may represent a system which can divert banknotes along more than two paths, for example to separate the banknotes in terms of their denomination in addition to reject notes which are of an unexpected type, such as counterfeit notes. It will further be appreciated that the computer system 10 may receive information not only from the x-ray detector 8, but also from other detectors positioned along the transport path that are known in the art, these including visible, infrared or ultraviolet detectors in either or each of reflective or transmissive arrangements, together with various dimensional sensors including multiple thickness sensors.

The apparatus 100 is arranged to operate by analysing the banknote structure in one or more regions, some or all of which may include security features such as watermarks, optically variable elements and so on. As is known, such security features are present in a number of different denominations of currency from a number of different countries, their number, arrangement and type depending upon the banknote type in question. In the present case the inspection region is equal to that of the entire banknote. This is because the apparatus functions so as to search for the presence of discontinuities within the banknote. Some such discontinuities are "expected" in the sense of boundaries of for example a security thread or a holographic element. However, usually such discontinuities are only partial in that there exists a continuation of at least some of the banknote substrate material across the discontinuity boundary. By contrast, full discontinuities in which there is a complete absence of the substrate material at, or upon one side of, the discontinuity are relatively rare in genuine undamaged banknotes. It is desirable to detect the presence of unexpected discontinuities, that is, ones not present as a result of manufacture, in genuine undamaged currency.

Figure 2:
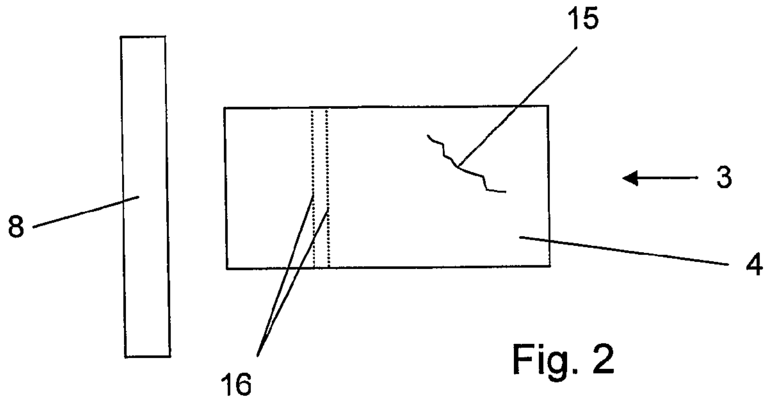
FIG. 2 shows a short edge feed arrangement for use with the example.
Figure 4A:
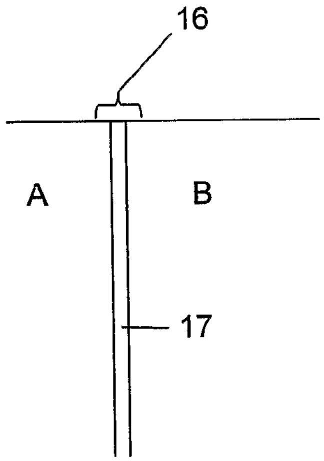
FIG. 4*a* shows a composite banknote discontinuity.

One arrangement of the apparatus of FIG. 1 is shown in FIG. 2, in which the transport mechanism is arranged as a "short edge feed" mechanism in which the short edges of the banknote are the leading and trailing edges as the banknote passes along the transport 1. This is illustrated by the arrow 3. For this reason, the detector 8 is arranged as a line scan camera in which the "line" is the dimension parallel to that of the short edge of the banknote. Thus, as the banknote passes adjacent to the detector 8, x-ray information is received from an area spanning its width. FIG. 2 also illustrates the existence of two unexpected types of discontinuity in the banknote 8. The first of these is the presence of a narrow strip of counterfeit material, the boundaries between this and the genuine banknote material being indicated at 16. The material between the lines 16 is counterfeit and is intended to mimic the properties of the banknote material substrate which is located upon either side of the strip. The lines 16 therefore indicate a discontinuity in the substrate between genuine and counterfeit material. This is shown more clearly in FIG. 4*a* where one such discontinuity is illustrated. The genuine material A on the left of FIG. 4 can be seen to be bonded to the counterfeit material B on the right hand side. This is the type of discontinuity found in a composite note. The bonding is achieved by a thin layer of glue 17 at the interface between A and B. It should be noted that the glue 17 has a different x-ray density than that of the paper materials A and B. Even if A and B have a similar x-ray response, the existence of the glue can be detected as a fine line in an x-ray image. If A and B have a dissimilar x-ray response for example due to a different density, then the discontinuity can be detected with or without the presence of the glue 17. It should also be noted that such a discontinuity may be found between material types A and A and B and B also.

Figure 4B:
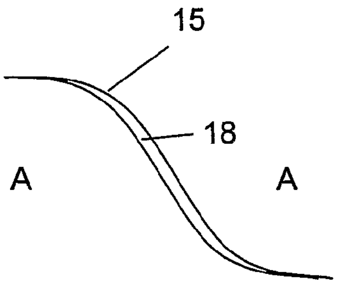
FIG. 4*b* shows a gap due to a cut.

Returning to FIG. 2, the second unexpected discontinuity is illustrated at 15, this being a through thickness tear in the substrate. FIG. 4*b* shows this in more detail at greater magnification. In FIG. 4*b* there is a tear in a continuous region of material A, this forming the discontinuity 15. The tear produces a small gap between the two edges of the material A, this being illustrated at 18. The gap is therefore simply air-filled and can provide line-of-sight between the x-ray source 5 and detector 8 positioned upon either side of the transport path. Thus, the gap 18 is responsible for a high level of detected intensity of x-rays in a transmissive arrangement. The location and extent of the discontinuity 15 can therefore be determined due to the existence of one or more gaps 18 along the tear.

Whilst the above discussion has been with reference to a cut in the form of a tear, it will be appreciated that similar comments apply to a cut in the form of an incision.

In some places the opposing sides of the discontinuity are spaced apart by a gap 18, whereas in others, the material A may be forced to overlap (causing double thickness). This is likewise detectable by a reduced intensity of received x-rays.

Typically the area of the banknote from which x-rays are received by the detector 8 is significantly narrower in a direction 3 than the banknote length. Thus when in use, the controller 6 repeatedly reads out data from the detector so as to build up a series of consecutive line scans of the note and these data are then processed by the computer 10. Preferably the regions from which the x-rays are detected upon the banknote are adjacent one another such that their edges interface, although it will be appreciated that this is not essential provided sufficient x-ray data is obtained from the features 15 and 16. An overlap of the line scan regions or spaces between the regions is therefore contemplated.

Figure 3:
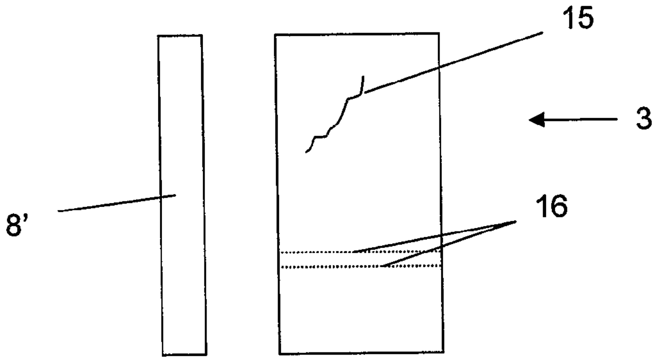
FIG. 3 shows an alternative long edge feed arrangement.

An alternative feed arrangement is shown in FIG. 3 in which the banknote is conveyed in a "long edge" feed configuration, the long edge therefore forming the leading and trailing edges of the note as it passes along the transport path 1. As will be appreciated in this case, the extent of the detector 8' need only be that of a length and position sufficient to read information from the target inspection region in question. Multiple detectors may be provided to observe discontinuities 15,16 at different parts of the banknotes although in the present case a single detector is used having a length at least equal to that of the banknote long edge.

Figure 5:
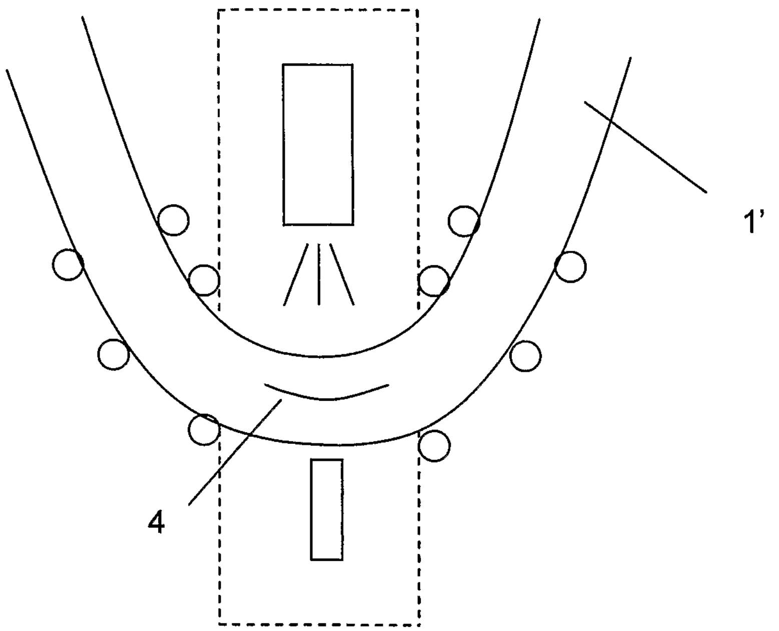
FIG. 5 is an alternative example apparatus having a curved transport path; and, FIG. 6 is a flow diagram of an example method.

As will be appreciated from the above, if the banknote material can be spread flat or even stretched in a particular direction, then discontinuities running normal to such a direction will have a higher chance of being detected. In FIG. 5 a modification of the apparatus is illustrated in which the transport path 1' has a highly curved geometry in the vicinity of the x-ray source and detector. The purpose of this is to improve the imaging of the discontinuities, particularly those having a component aligned with the long edge of the banknote. Since the banknote 4 is forced through a curved trajectory whilst being imaged, the edges of any incisions or tears along its length will be separated, generating gaps 18.

Turning now to the use of the data generated by the x-ray detector 8, there are a number of ways in which the information may be processed, depending upon the intended use of the apparatus 100.

In very a basic example, line scan data from the detector 8 can be analysed by monitoring the number of "pixels" from the x-ray detector which provide a transmissive intensity level below a predetermined threshold (data corresponding to "dark" pixels). Thus, regardless of the positional information, if more than a predetermined number of pixels meet the threshold requirement, or the number of pixels meeting such a requirement lies within a predetermined range, then a banknote having an expected contrast can be deemed to be present. If a gap 18 is present for example then a number of high intensity pixels will be present which can be distinguished from a genuine undamaged note. With this simple level of analysis, the banknote in question can be deemed to be of an "expected" type and is therefore directed, via gate 11, along the transport path branch 12. Any banknotes not meeting this criterion are diverted along the "unexpected" path 13 as controlled by the computer 10. Such a test only provides a very basic test and no spatial information regarding the position of the features is used in this case.

In a more advanced and preferred alternative, data representing consecutive scan lines from the detector 8 are formed into image data. The data are then analysed by image analysis techniques analogous to those used in optical imaging of banknotes. This is now discussed in more detail with reference to FIG. 6 which is a flow diagram of such a method.

Figure 6:
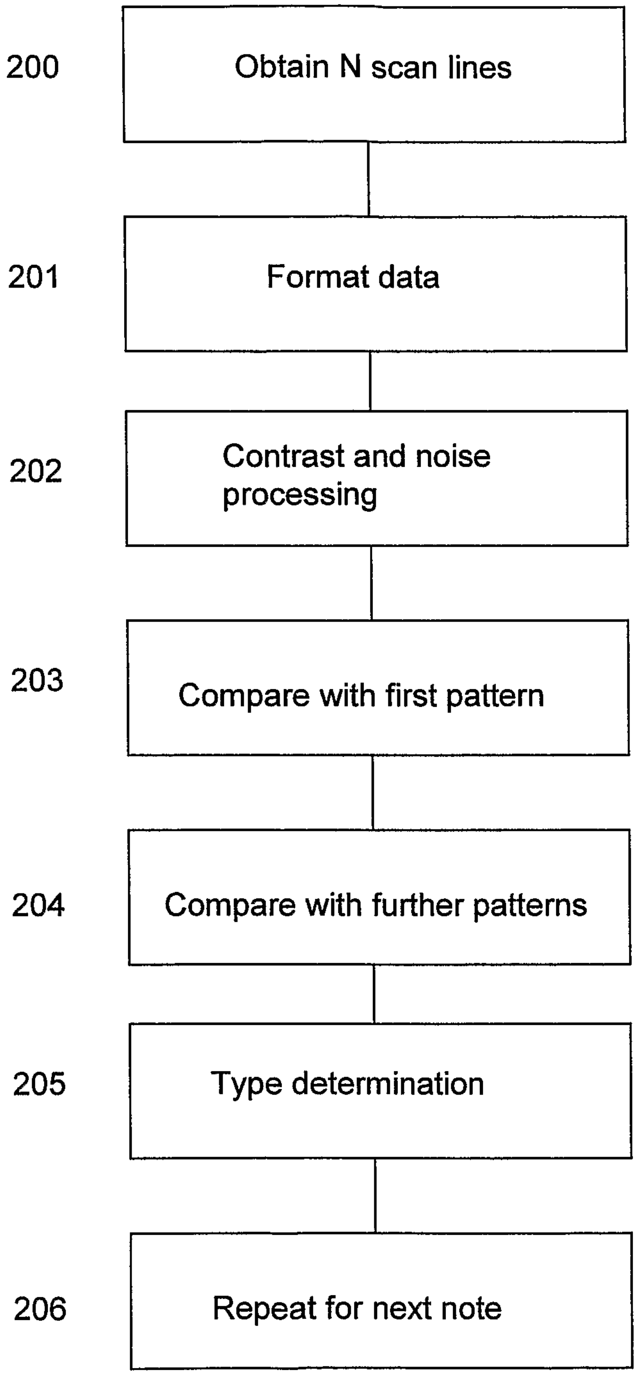

In FIG. 6, at step 200, the x-ray source 5 and detector 8 are controlled by the controller in response to instruction from the computer 10 so as to produce an optimised level of contrast for a given transport path speed and type of banknote. For a given banknote passing along the transport path 1 between the source 5 and detector 8, N lines of scan data are obtained via the controller 6 from the x-ray detector 8.

As will be appreciated, each scan line contains a large quantity of "pixel" data, including an x-ray intensity for each pixel along the line of the detector. At step 201, the scan lines are arranged in a predetermined format for processing. This may include arranging the data in a store in which the pixels on different scan lines are represented consecutively in a data stream.

At step 202, the data are processed according to contrast criteria to ensure that the expected contrast levels for such data have been received. Some processing analogous to "gamma correction" may be performed depending upon the known intensity response of the detector. This step may also involve further processing steps to reduce noise within the data.

At step 203, a first "master" image or pattern is obtained from a store within the computer 10, and the data are compared with the master pattern data. The data of the master and that obtained from the detector correspond to similar regions of the banknote. In the present case the entire banknote is imaged as the inspection region in a search for discontinuities 15, 16. The master represents nominal image data from a genuine undamaged banknote in a given orientation. The master may be generated by using the apparatus to scan numerous genuine banknotes. This inspection of the banknote in the inspection position of the transport path is provided by examining the detector response for the banknote under scrutiny. In the case of discontinuities known "edge detection" type algorithms may be applied to search for discontinuities in the image. As was mentioned earlier, genuine banknotes may contain some genuine discontinuities as a matter of design. The processor therefore locates each of the discontinuities and compares each with the presence of any discontinuities in the master pattern data.

At step 204, similar comparisons are made with two or more other master patterns. Typically four master patterns are provided for each type of banknote, these relating to the four different possible ways that a banknote may be fed in a short edge feed or long edge feed mode.

At step 205, a "type" determination is made based upon the comparison steps 203 and 204. Specifically, if one of the master patterns matches the data corresponding to that received by the detector to a sufficient predetermined degree of accuracy then a corresponding output signal is generated, and used to control the gate 11 to direct the note along the "expected" transport path branch. If an insufficient match is obtained with each of the master patterns, then the note is determined as an unexpected type and is sent along the path branch 13. This may be because of damage to a genuine note, or because the note in question contains discontinuities due to counterfeiting.

At step 206, the process returns to step 200 so as to analyse the next note in the transport path. The computer 10 may make adjustments to the operational parameters of the source and detector (such as power or gain) or the speed of the transport path at each step 200 so as to maximise the accuracy of the analysis. Such adjustments may be made based upon the data received from one or more banknotes analysed in previous steps.

It will further be appreciated that different denominations of note may be distinguished using the method of FIG. 6, in addition to any discontinuity analysis.

Whilst four patterns may be used for each type of denomination, if there are five different denomination types for a particular currency, then 20 different patterns may be used for comparison. If the apparatus is arranged to distinguish between two or more different types of denomination within the "expected" types, together with unexpected types, then either a multiple path gate 11 may be used, or the path 12 may be subdivided into further paths downstream using one or more further gates.

It should be noted that in step 202, following the contrast and noise processing, it may be quickly determined that a note of unexpected type is present since the expected contrast or intensity range within the data may not be present. This note may therefore be rejected as an unexpected type at step 202. Of course this may be due to the note being counterfeit or, in the case of a genuine note being present, it may indicate a malfunction with the detector or the source.

With the method illustrated in FIG. 6, it will be appreciated that a short edge feed or a long edge feed may be used.

The apparatus discussed above may be used in various different types of different document processing systems. For example, it may be used in systems to distinguish between types of document, when determining different denominations of document, or in an authentication system. It will be appreciated that the system may be used in conjunction with other detection techniques, including optical, ultraviolet, infrared, magnetic and dimensional techniques so as to improve the accuracy of document processing by inspecting either similar or dissimilar features to those inspected using x-rays.

The invention claimed is:

1. An apparatus for analysing a security document, comprising:

an x-ray source configured to illuminate at least one inspection region of the security document when located at an inspection position;

an x-ray detector configured to receive x-rays from the at least one inspection region of the document and to generate a corresponding detector response; and a processor configured to analyse the detector response in the form of x-ray data so as to locate one or more discontinuities in the structure of the document and to generate an output signal indicative of the structure of the document in the at least one inspection region.

2. The apparatus according to claim 1, further comprising a transport path for transporting the document through the inspection position, wherein the apparatus is arranged such that the x-ray source illuminates the document when in the transport path.

3. The apparatus according to claim 2, wherein the security document is fed along the transport path by a leading edge and wherein the length of the detector is equal to at least that of the leading edge.

4. The apparatus according to claim 1, wherein the x-ray source and x-ray detector are located upon opposite sides of the transport path according to a transmissive arrangement.

5. The apparatus according to claim 1, wherein the x-ray source and/or detector are positioned approximately normally to a face of the document as it passes along the transport path.

6. The apparatus according to claim 1, wherein the discontinuities include interfaces present within the structure of the document.

7. The apparatus according to claim 6, wherein the interfaces are between materials of a similar type.

8. The apparatus according to claim 6, wherein the interfaces include an adhesive.

9. The apparatus according to claim 6, wherein the interfaces comprise cuts within the document.

10. The apparatus according to claim 1, wherein the x-ray source and detector are configured to generate sufficient x-ray contrast so as to locate the position of the said discontinuities.

11. The apparatus according to claim 1, wherein the x-ray detector is a line scan detector.

12. The apparatus according to claim 1, wherein the processor is configured to analyse the detector response by comparing the obtained response with a predetermined response.

13. The apparatus according to claim 12, wherein the processor is configured to generate an image of the inspection region formed from a number of detector responses generated at different locations for each document.

14. The apparatus according to claim 13, wherein the processor is configured to compare the image with one or more predetermined master images.

15. The apparatus according to claim 14, wherein the comparison comprises using an image analysis process and wherein the output signal is dependent upon the result of the image analysis process.

16. The apparatus according to claim 12, wherein the output signal is dependent upon the degree of correspondence between the obtained and predetermined responses.

17. The apparatus according to claim 1, wherein the apparatus is a document sorter for sorting documents according to their type.

18. The apparatus according to claim 1, wherein the apparatus is a document authenticator for sorting genuine documents from counterfeit documents.

19. The apparatus according to claim 1, wherein the apparatus is banknote processing apparatus and wherein the documents are banknotes.

20. The apparatus according to claim 1, wherein the documents are processed at a rate of 600 per minute or more.

21. A method of analysing a security document, the method comprising:

illuminating at least one inspection region of the security document with x-rays from an x-ray source, whilst the document is in an inspection position;

receiving x-rays from the at least one inspection region at an x-ray detector configured to generate a corresponding detector response; and analysing the detector response in the form of x-ray data so as to locate one or more discontinuities in the structure of the document and to generate an output signal indicative of the structure of the document within the at least one inspection region.

22. The method according to claim 21, further comprising transporting the security document to and from the inspection position along a transport path.

23. The method according to claim 22, wherein the document is in motion whilst the x-rays are received.

24. The method according to claim 21, further comprising processing data representative of the detector response so as to modify the intensity contrast.

25. The method according to claim 21, further comprising processing data representative of the detector response so as to reduce noise.

26. The method according to claim 21, wherein the discontinuities are interfaces.

27. The method according to claim 26, wherein the method comprises detecting an adhesive present at the interfaces.

28. The method according to claim 21, wherein the analysis comprises comparing the detector response with a threshold intensity level.

29. The method according to claim 21, wherein the analysis comprises comparing the detector response with one or more master patterns corresponding to expected document types.

30. The method according to claim 21, wherein the output signal is indicative of whether the document is of an expected type or an unexpected type.

31. The method according to claim 30, further comprising diverting documents of an expected type along a first transport path and those of an unexpected type along a second document path.

* * * * *